United States Patent
Jeong

(10) Patent No.: US 8,952,746 B1
(45) Date of Patent: Feb. 10, 2015

(54) SEMICONDUCTOR APPARATUS

(71) Applicant: SK Hynix Inc., Icheon-si, Gyeonggi-do (KR)

(72) Inventor: Hyun Sik Jeong, Icheon-si (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 14/100,192

(22) Filed: Dec. 9, 2013

(30) Foreign Application Priority Data

Aug. 30, 2013 (KR) .................. 10-2013-0103839

(51) Int. Cl.
*H02M 3/07* (2006.01)
(52) U.S. Cl.
CPC ..................... *H02M 3/07* (2013.01)
USPC ....................................... 327/536
(58) Field of Classification Search
CPC ........................... H02M 3/07; H02M 3/073
USPC ....................................... 327/536
See application file for complete search history.

(56) References Cited

U.S. PATENT DOCUMENTS

| | | | | |
|---|---|---|---|---|
| 6,650,172 B1* | 11/2003 | Shingyouchi | ................. | 327/536 |
| 7,005,912 B2* | 2/2006 | Nonaka | ................. | 327/536 |
| 7,253,676 B2* | 8/2007 | Fukuda et al. | ................. | 327/536 |
| 7,525,853 B2* | 4/2009 | Kitazaki et al. | ......... | 365/189.11 |
| 7,583,131 B2* | 9/2009 | Kimura et al. | ................. | 327/534 |
| 8,305,799 B2* | 11/2012 | Tsukada | ................. | 365/163 |
| 8,421,522 B2* | 4/2013 | Yoo | ................. | 327/536 |
| 8,503,253 B2* | 8/2013 | Tsukada | ................. | 365/189.07 |
| 8,519,779 B2* | 8/2013 | Ryu | ................. | 327/536 |
| 8,692,608 B2* | 4/2014 | Chen | ................. | 327/536 |
| 2002/0075063 A1* | 6/2002 | Hwang | ................. | 327/536 |
| 2006/0203594 A1* | 9/2006 | Matano | ................. | 365/226 |
| 2014/0055891 A1* | 2/2014 | Kwon et al. | ................. | 361/56 |

FOREIGN PATENT DOCUMENTS

KR 1020050079179 A 8/2005

* cited by examiner

*Primary Examiner* — Thomas J Hiltunen
(74) *Attorney, Agent, or Firm* — William Park & Associates Patent Ltd.

(57) ABSTRACT

A negative voltage pumping unit including a driver configured to receive an external high-voltage and an external voltage and drive and output an oscillator signal, and a capacitor configured to perform a pumping operation and generate a negative voltage; and an internal circuit configured to receive a ground voltage and the voltage of a node.

16 Claims, 4 Drawing Sheets

SEMICONDUCTOR APPARATUS

CROSS-REFERENCES TO RELATED APPLICATION

The present application claims priority under 35 U.S.C. §119(a) to Korean application number 10-2013-0103839, filed on Aug. 30, 2013, in the Korean Intellectual Property Office, which is incorporated herein by reference in its entirety.

BACKGROUND

1. Technical Field

Various embodiments relate to a semiconductor integrated circuit, and more particularly, to a semiconductor apparatus.

2. Description of Related Art

A semiconductor apparatus receives a voltage from an exterior, and generates and uses a voltage having a voltage level required inside the semiconductor apparatus.

A voltage generated inside is called an internal voltage. An internal voltage is generally generated by down-converting a voltage applied from an exterior, but an interval voltage may be generated as a voltage having a higher voltage level or as a voltage having a lower voltage level than a voltage applied from an exterior.

In this case, a voltage having a higher voltage level or a voltage having a lower voltage level than a voltage applied from an exterior is generated by a pumping operation, and is thus called a pumping voltage.

The generation of a pumping voltage is accommodated with power consumption to increase or decrease, through a pumping operation, the voltage level of a voltage applied from an exterior, wherein since the efficiency of the pumping operation is lower than the efficiency of down-converting to generate another internal voltage, the power consumption for the generation of the pumping voltage is greater than that for the generation of the other internal voltage.

Power consumed to generate a pumping voltage acts as an obstacle to implementation of a low-power semiconductor apparatus.

SUMMARY

A semiconductor apparatus which consumes less power than a normal semiconductor apparatus is described herein.

In an embodiment of the invention, a semiconductor apparatus includes: a negative voltage pumping unit including a driver configured to receive an external high-voltage and an external voltage and drive and output an oscillator signal, and a capacitor configured to perform a pumping operation and generate a negative voltage; and an internal circuit configured to receive a ground voltage and the voltage of a node.

In an embodiment of the invention, a semiconductor apparatus includes: a variable period oscillator configured to generate an oscillator signal; a negative voltage pumping unit including a driver configured to drive the oscillator signal to the voltage level of an external high-voltage and the voltage level of an external voltage, and a capacitor configured to perform a pumping operation, the negative voltage pumping unit generating a negative voltage; a first negative voltage sensing unit configured to sense the voltage level of the negative voltage and to generate an oscillator enable signal; a second negative voltage sensing unit configured to sense the voltage level of the negative voltage and to generate the frequency control signal; and an internal circuit configured to be electrically coupled to a node and to receive a ground voltage.

In an embodiment of the invention, a semiconductor apparatus includes: a negative voltage pumping unit configured to receive an external high-voltage and an external voltage and drive and transfer an oscillator signal to a capacitor for a pumping operation to be performed; and an internal circuit electrically coupled to a node and ground terminal and configured to receive a voltage of the node and a ground voltage.

BRIEF DESCRIPTION OF THE DRAWINGS

Features, aspects, and embodiments are described in conjunction with the attached drawings, in which.

DETAILED DESCRIPTION

Hereinafter, a semiconductor apparatus according to the invention will be described below with reference to the accompanying drawings through various embodiments.

Figure 1:
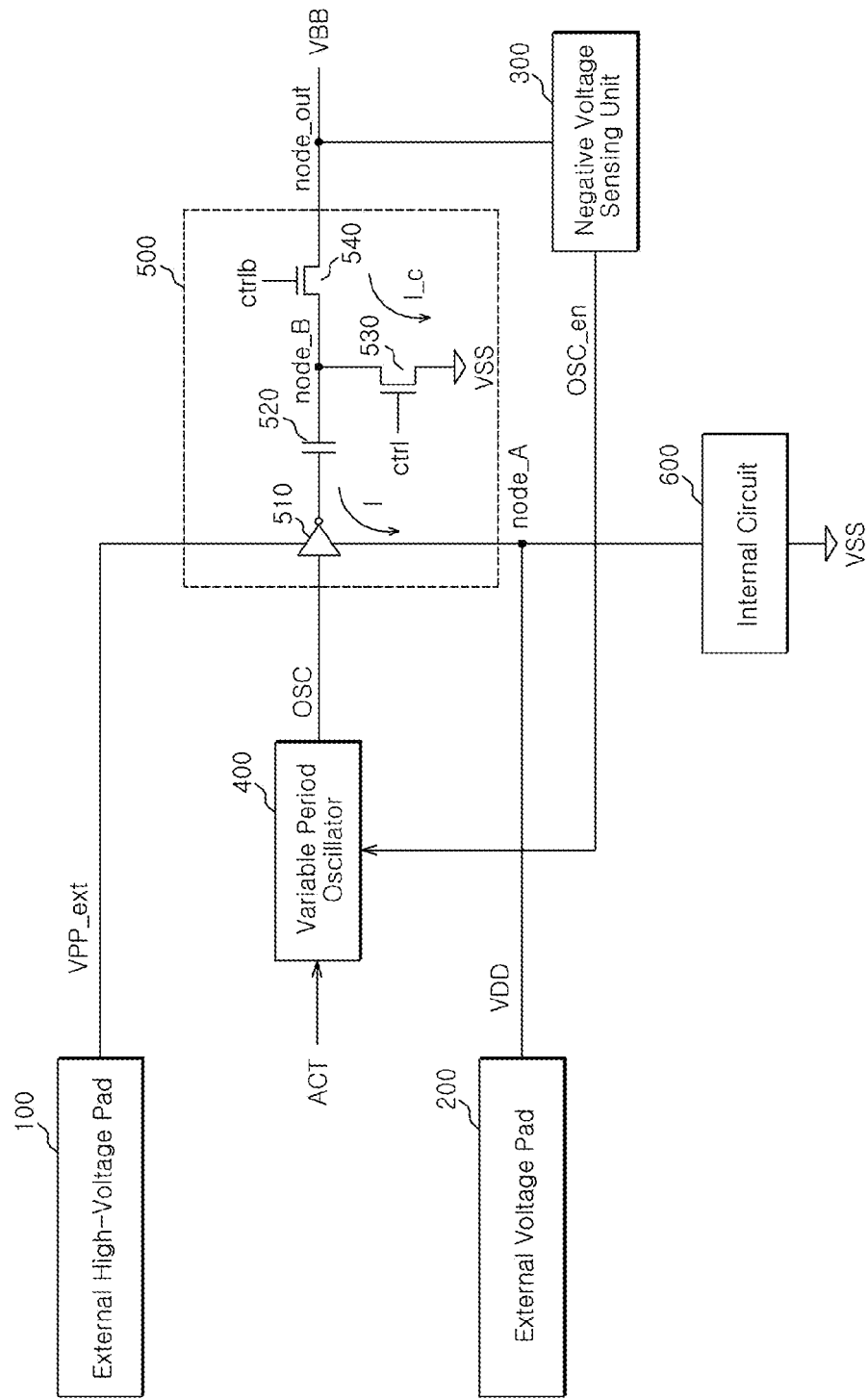
FIG. 1 is a block diagram illustrating the configuration of a semiconductor apparatus according to an embodiment of the invention.

As illustrated in FIG. 1, a semiconductor apparatus according to an embodiment of the invention can include an external high-voltage pad 100, an external voltage pad 200, a negative voltage sensing unit 300, a variable period oscillator 400, a negative voltage pumping unit 500, and an internal circuit 600.

The external high-voltage pad 100 receives an external high-voltage VPP_ext from the outside of the semiconductor apparatus.

The external voltage pad 200 receives an external voltage VDD from the outside of the semiconductor apparatus. In this case, the external high-voltage VPP_ext may have a higher voltage level than the external voltage VDD.

The negative voltage sensing unit 300 senses the voltage level of a negative voltage VBB, and generates an oscillator enable signal OSC_en. For example, the negative voltage sensing unit 300 can enable the oscillator enable signal OSC_en when the voltage level of the negative voltage VBB is higher than a target level.

Figure 2:
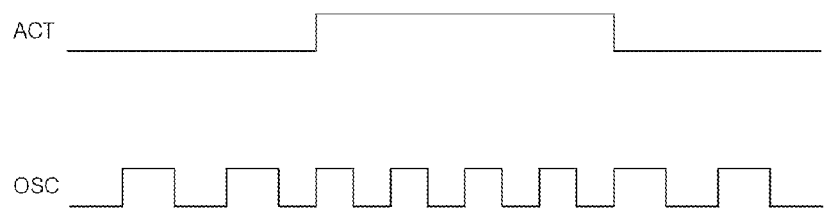
FIG. 2 is a timing diagram explaining an embodiment of the invention.

The variable period oscillator 400 generates an oscillator signal OSC in response to an active signal ACT and the oscillator enable signal OSC_en. For example, the variable period oscillator 400 can generate the oscillator signal OSC when the oscillator enable signal OSC_en is enabled. In addition, the variable period oscillator 400 can generate an oscillator signal OSC having a higher frequency when the active signal ACT is enabled than when the active signal ACT is disabled. Referring to FIG. 2, the variable period oscillator 400 generates an oscillator signal OSC having a higher frequency in a region where the active signal ACT is enabled to a high level than in a region where the active signal ACT is disabled to a low level.

Referring to FIG. 1, the negative voltage pumping unit 500 performs a pumping operation in response to a control signal ctrl and the oscillator signal OSC, and generates the negative voltage VBB through the pumping operation.

The negative voltage pumping unit 500 can include a driver 510, a capacitor 520, and first and second switches 530 and 540, respectively.

The driver 510 receives the external high-voltage VPP_ext and the external voltage VDD as a driving voltage, and drives and outputs the oscillator signal OSC. For example, the driver 510 drives the oscillator signal OSC to transition to the voltage level of the external high-voltage VPP_ext and the voltage level of the external voltage VDD, and transfers the driven oscillator signal OSC to the capacitor 520. In this case, the driver 510 may receive the external voltage VDD from a first node Node_A. The first node Node_A may be electrically coupled in common to the external voltage pad 200 to which the external voltage VPP_ext is applied from an exterior, the driver 510, and the internal circuit 600.

The capacitor 520 performs a pumping operation in response to the output of the driver 510, and generates the negative voltage VBB.

The first switch 530 electrically couples or electrically decouples a second node Node_B to or from a ground terminal VSS in response to a control signal ctrl.

The second switch 540 electrically couples or electrically decouples the second node Node_B to or from an output node Node_out in response to an inverted control signal ctrlb. In this case, the inverted control signal ctrlb may be obtained by inverting the control signal ctrl.

The internal circuit 600 is electrically coupled to the first node Node_A and the ground terminal VSS, and receives the voltage level of the first node Node_A through which the driver 510 receives the external voltage VPP_ext and the ground terminal VSS and operates.

The operation of a semiconductor apparatus, configured as above, according to an embodiment of the invention is as follows.

The negative voltage sensing unit 300 enables an oscillator enable signal OSC_en when a negative voltage VBB becomes higher than a target level.

The variable period oscillator 400 generates an oscillator signal OSC when the oscillator enable signal OSC_en is enabled. In this case, the variable period oscillator 400 determines the frequency of the oscillator signal OSC in response to an active signal ACT.

The oscillator signal OSC is applied to the driver 510, which receives an external high-voltage VPP_ext and an external voltage VDD as a driving voltage, and the driver 510 drives the oscillator signal OSC and outputs a signal for the oscillator signal OSC to transition to the voltage level of the external high-voltage VPP_ext and the voltage level of the external voltage VDD.

The capacitor 520 and the first and second switches 530 and 540 perform a pumping operation in response to the output of the driver 510 and a control signal ctrl, and thus generate a negative voltage VBB.

In more detail, when the output of the driver 510 is lowered from the external high-voltage VPP_ext to the external voltage VDD, the capacitor 520 may lower the voltage level of the second node Node_B, by the coupling phenomenon of the capacitor 520, by a voltage corresponding to a level difference between the external high-voltage VPP_ext and the external voltage VDD. In this case, the first switch 530 may be turned on to electrically couple the second node Node_B to the ground terminal VSS, and the second switch 540 may be turned off to electrically decouple the second node Node_B from the output node Node_out. After the voltage level of the second node Node_B is lowered, the first switch 530 may be turned off and the second switch 540 may be turned on, thereby transferring the voltage level of the second node Node_B to the output node Node_out.

In view of current, when the output of the driver 510 is lowered from the external high-voltage VPP_ext to the external voltage VDD, the driver 510 may make current I to flow to the first node Node_A. In this case, by the coupling phenomenon of the capacitor 520, coupling current I_c corresponding to the current I may flow from the second node Node_B to the ground terminal VSS. When the coupling current I_c flows from the second node Node_B to the ground terminal VSS, the voltage level of the second node Node_B may be lowered.

The internal circuit 600 is electrically coupled to the first node Node_A and the ground terminal VSS. In this case, the first node Node_A may be electrically coupled to the external voltage pad 200, to which the external voltage VDD is applied.

Accordingly, the internal circuit 600 receives the external voltage VDD and the current I applied from the driver 510, and operates.

Since the current I used for a pumping operation is reused as operating current of the internal circuit 600, the semiconductor apparatus according to an embodiment of the invention can reduce current consumption. Since the frequency of the oscillator signal OSC is raised in an active region where a negative voltage VBB is frequently used, i.e. in an enable region of an active signal ACT, the negative voltage VBB is more rapidly lowered to a target level or less in a region where the voltage level of the negative voltage VBB is raised.

Figure 3:
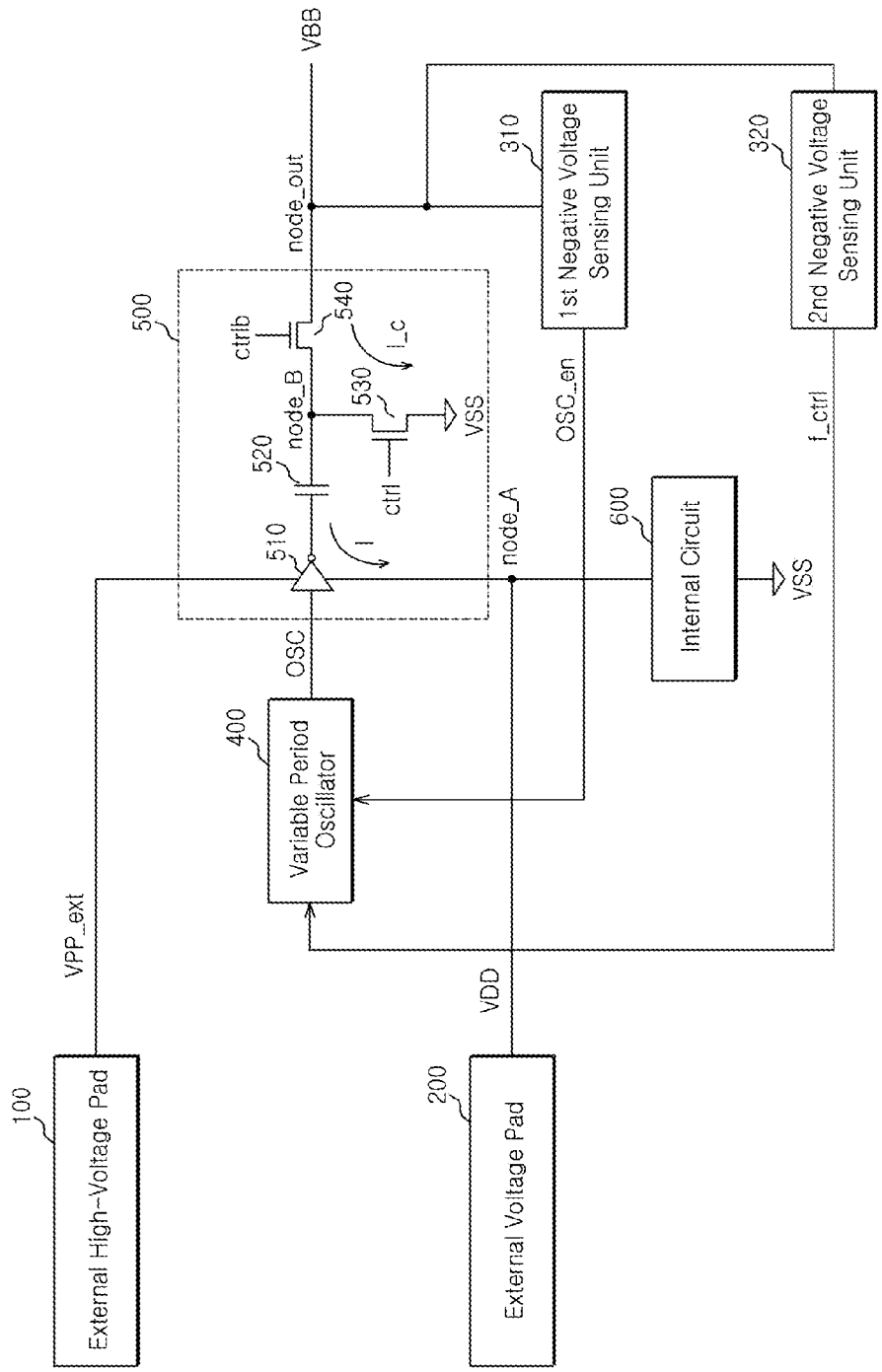
FIG. 3 is a block diagram illustrating the configuration of a semiconductor apparatus according to an embodiment of the invention.

As illustrated in FIG. 3, a semiconductor apparatus according to an embodiment of the invention can include an external high-voltage pad 100, an external voltage pad 200, first and second negative voltage sensing units 310 and 320, respectively, a variable period oscillator 400, a negative voltage pumping unit 500, and an internal circuit 600.

The external high-voltage pad 100 receives an external high-voltage VPP_ext from the outside of the semiconductor apparatus.

The external voltage pad 200 receives an external voltage VDD from the outside of the semiconductor apparatus. In this case, the external high-voltage VPP_ext may have a higher voltage level than the external voltage VDD.

The first negative voltage sensing unit 310 senses the voltage level of a negative voltage VBB, and generates an oscillator enable signal OSC_en. For example, the first negative voltage sensing unit 310 can enable the oscillator enable signal OSC_en when the voltage level of the negative voltage VBB is higher than a first target level.

The second negative voltage sensing unit 320 senses the voltage level of the negative voltage VBB and is configured to the voltage level of the negative voltage VBB, and generates a frequency control signal f_ctrl. For example, the second negative voltage sensing unit 320 can enable the frequency control signal f_ctrl when the voltage level of the negative voltage VBB is higher than a second target level. In this case, the second target level is higher than the first target level.

The variable period oscillator 400 generates an oscillator signal OSC in response to a frequency control signal f_ctrl and the oscillator enable signal OSC_en. For example, the variable period oscillator 400 can generate the oscillator signal OSC when the oscillator enable signal OSC_en is enabled. In addition, the variable period oscillator 400 can generate an oscillator signal OSC having a higher frequency when the frequency control signal f_ctrl is enabled than when the frequency control signal f_ctrl is disabled. Moreover, the variable period oscillator 400 may be configured to control the frequency of oscillator signal OSC in response to the frequency control signal f_ctrl. Referring to FIG. 2, the variable period oscillator 400 generates an oscillator signal OSC having a higher frequency in a region where the active signal ACT is enabled to a high level than in a region where the active signal ACT is disabled to a low level.

The negative voltage pumping unit 500 performs a pumping operation in response to a control signal ctrl and the oscillator signal OSC, and generates the negative voltage VBB through the pumping operation.

The negative voltage pumping unit 500 can include a driver 510, a capacitor 520, and first and second switches 530 and 540, respectively.

The driver 510 receives the external high-voltage VPP_ext and the external voltage VDD as a driving voltage, and drives and outputs the oscillator signal OSC. For example, the driver 510 drives the oscillator signal OSC to transition to the voltage level of the external high-voltage VPP_ext and the voltage level of the external voltage VDD, and transfers the driven oscillator signal OSC to the capacitor 520. In this case, the driver 510 may receive the external voltage VDD from a first node Node_A. The first node Node_A is electrically coupled to the external voltage pad 200 which receives the external voltage VPP_ext from an exterior.

The capacitor 520 performs a pumping operation in response to the output of the driver 510, and generates the negative voltage VBB.

The first switch 530 electrically couples or electrically decouples a second node Node_B to or from a ground terminal VSS in response to a control signal ctrl.

The second switch 540 electrically couples or electrically decouples the second node Node_B to or from an output node Node_out in response to an inverted control signal ctrlb. In this case, the inverted control signal ctrlb may be obtained by inverting the control signal ctrl.

The internal circuit 600 is electrically coupled to the first node Node_A through which the driver 510 receives the external voltage VPP_ext and the ground terminal VSS, and receives the voltage level of the first node Node_A and the ground terminal VSS and operates. The internal circuit 600 is configured to receive, from the first node Node_A, current I which flows out from the driver 510.

The operation of a semiconductor apparatus, configured as above, according to an embodiment of the invention is as follows.

The first negative voltage sensing unit 310 enables an oscillator enable signal OSC_en when a negative voltage VBB becomes higher than a target level.

The variable period oscillator 400 generates an oscillator signal OSC when the oscillator enable signal OSC_en is enabled. In this case, the variable period oscillator 400 may determine the frequency of the oscillator signal OSC in response to a frequency control signal f_ctrl.

The oscillator signal OSC is applied to the driver 510, using an external high-voltage VPP_ext and an external voltage VDD as a driving voltage, and the driver 510 drives the oscillator signal OSC and outputs a signal for the oscillator signal OSC to transition to the voltage level of the external high-voltage VPP_ext and the voltage level of the external voltage VDD.

The capacitor 520 and the first and second switches 530 and 540 perform a pumping operation in response to the output of the driver 510 and a control signal ctrl, and thus generate a negative voltage VBB.

In more detail, when the output of the driver 510 is lowered from the external high-voltage VPP_ext to the external voltage VDD, the capacitor 520 may lower the voltage level of the second node Node_B, by the coupling phenomenon of the capacitor 520, by a voltage corresponding to a level difference between the external high-voltage VPP_ext and the external voltage VDD. In this case, the first switch 530 may be turned on to electrically couple the second node Node_B to the ground terminal VSS, and the second switch 540 is turned off to electrically decouple the second node Node_B from the output node Node_out. After the voltage level of the second node Node_B is lowered, the first switch 530 may be turned off and the second switch 540 may be turned on, thereby transferring the voltage level of the second node Node_B to the output node Node_out.

In view of current, when the output of the driver 510 is lowered from the external high-voltage VPP_ext to the external voltage VDD, the driver 510 may make current I to flow to the first node Node_A. In this case, by the coupling phenomenon of the capacitor 520, coupling current I_c corresponding to the current I may flow from the second node Node_B to the ground terminal VSS. When the coupling current I_c flows from the second node Node_B to the ground terminal VSS, the voltage level of the second node Node_B may be lowered.

The internal circuit 600 is electrically coupled to the first node Node_A and the ground terminal VSS. In this case, the first node Node_A may be electrically coupled to the external voltage pad 200, to which the external voltage VDD is applied.

Accordingly, the internal circuit 600 receives the external voltage VDD and the current I applied from the driver 510, and operates.

Since the current I used for a pumping operation is reused as operating current of the internal circuit 600, the semiconductor apparatus according to an embodiment of the invention can reduce current consumption. When the voltage level of the negative voltage VBB becomes higher than the second target level due to frequent use of the negative voltage VBB, the frequency of the oscillator signal OSC may be raised, so that the negative voltage VBB is more rapidly lowered to a target level or less in a region where the voltage level of the negative voltage VBB is raised.

Figure 4:
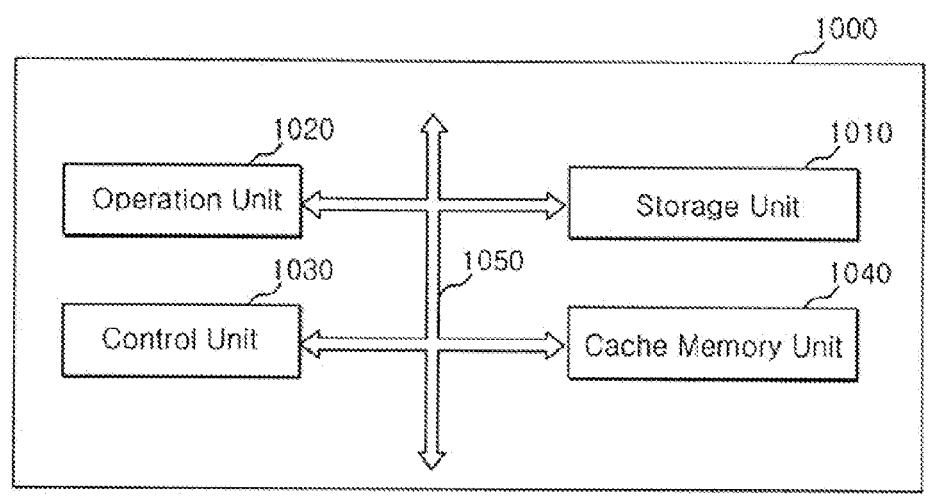
FIG. 4 is a block diagram illustrating the semiconductor apparatus in relation to a microprocessor according to an embodiment of the invention.

Referring to FIG. 4, a microprocessor 1000 may include a storage unit 1010, an operation unit 1020, and a control unit 1030. The microprocessor 1000 may be a variety of processing apparatuses, such as a central processing unit (CPU), a graphic processing unit (GPU), a digital signal processor (DSP), or an application processor (AP).

The storage unit 1010 may be a processor register or a register, and the storage unit may be a unit that may store data in the microprocessor 1000. The storage unit 1010 may also include various registers. The storage unit 1010 may also temporarily store data to be operated in the operation unit 1020, resulting data to be performed in the operation unit 1020, and an address in which data to be operated is stored.

The storage unit 1010 may include the semiconductor apparatus described above.

The operation unit 1020 may perform an operation in the microprocessor 1000, and perform a variety of four fundamental rules of an arithmetic operation or a logic operation depending on a command in the control unit 1030. The operation unit 1020 may include one or more arithmetic and logic units (ALU).

The control unit 1030 receives a signal from the storage unit 1010, the operation unit 1020, or an external apparatus of the microprocessor, performs extraction or decryption of a command, or input or output control, and executes a process in a program form.

The microprocessor 1000 may further include a cache memory unit 140 suitable for temporarily storing data input from an external apparatus other than the storage unit 1010 or data to be output to an external apparatus. The cache memory unit 1040 may exchange data from the storage unit 1010, the operation unit 1020, and the control unit 1030 through a bus interface 1050.

A semiconductor apparatus according to the invention has lower power consumption than a normal semiconductor apparatus, and thus provides an advantage in implementing a low-power semiconductor apparatus.

While certain embodiments have been described above, it will be understood to those skilled in the art that the embodiments described are by way of example only. Accordingly, the apparatus described herein should not be limited based on the described embodiments. Rather, the apparatus described herein should only be limited in light of the claims that follow when taken in conjunction with the above description and accompanying drawings.

What is claimed is:

1. A semiconductor apparatus comprising:
a negative voltage pumping unit comprising a driver configured to receive an external high-voltage and an external voltage and drive and output an oscillator signal, and a capacitor configured to perform a pumping operation and generate a negative voltage; and
an internal circuit configured to receive a ground voltage and the voltage of a node,
wherein the node is configured to be electrically coupled in common to the driver, the internal circuit, and an external voltage pad to which the external voltage is applied from an exterior,
wherein the internal circuit is configured to receive, from the node, current which flows out from the driver, and a voltage level of the external voltage is between a voltage level of the external high voltage and a voltage level of the ground voltage.

2. The semiconductor apparatus according to claim 1, further comprising:
a negative voltage sensing unit configured to sense the voltage level of the negative voltage, and to generate an oscillator enable signal; and
a variable period oscillator configured to generate the oscillator signal in response to an active signal and the oscillator enable signal.

3. The semiconductor apparatus according to claim 2, wherein the variable period oscillator is configured to generate the oscillator signal when the oscillator enable signal is enabled, and to generate the oscillator signal having a higher frequency when the active signal is enabled than when the active signal is disabled.

4. The semiconductor apparatus according to claim 1, wherein the external high-voltage is applied to an external high-voltage pad from an exterior, and has a higher voltage level than the voltage level of the external voltage.

5. The semiconductor apparatus according to claim 4, wherein the driver is configured to drive the oscillator signal to transition to the voltage level of the external high-voltage and the voltage level of the external voltage, and to transfer the driven oscillator signal to the capacitor.

6. The semiconductor apparatus according to claim 1, further comprising:
a first negative voltage sensing unit configured to generate an oscillator enable signal when the negative voltage is higher than a first target level;
a second negative voltage sensing unit configured to generate a frequency control signal when the negative voltage is higher than a second target level; and
a variable period oscillator configured to generate the oscillator signal when the oscillator enable signal is enabled, and to control the frequency of the oscillator signal in response to the frequency control signal.

7. The semiconductor apparatus according to claim 6, wherein the first target level is lower than the second target level.

8. A semiconductor apparatus comprising:
a variable period oscillator configured to generate an oscillator signal;
a negative voltage pumping unit comprising a driver configured to drive the oscillator signal to the voltage level of an external high-voltage and the voltage level of an external voltage, and a capacitor configured to perform a pumping operation, the negative voltage pumping unit generating a negative voltage;
a first negative voltage sensing unit configured to sense the voltage level of the negative voltage and to generate an oscillator enable signal;
a second negative voltage sensing unit configured to the voltage level of the negative voltage and to generate a frequency control signal; and
an internal circuit configured to be electrically coupled to a node and to receive a ground voltage,
wherein the node is configured to be electrically coupled to an external voltage pad which receives the external voltage from an exterior,
wherein the internal circuit is configured to receive, from the node, current which flows out from the driver and a voltage level of the external voltage is between a voltage level of the external high voltage and a voltage level of the wound voltage.

9. The semiconductor apparatus according to claim 8, wherein:
the first negative voltage sensing unit is configured to enable the oscillator enable signal when the voltage level of the negative voltage is higher than a first target level; and
the second negative voltage sensing unit is configured to enable the frequency control signal when the voltage level of the negative voltage is higher than a second target level, wherein the second target level is higher than the first target level.

10. A semiconductor apparatus comprising:
a negative voltage pumping unit configured to receive an external high-voltage and an external voltage and drive and transfer an oscillator signal to a capacitor for a pumping operation to be performed;
and an internal circuit electrically coupled to a first node and ground terminal and configured to receive a voltage of the first node and a ground voltage,
wherein the negative voltage pumping unit receives an the external voltage from the first node that is electrically coupled to an external voltage pad,
wherein the internal circuit is configured to receive, from the first node, current which flows out from the negative voltage pumping unit, and a voltage level of the external voltage is between a voltage level of the external high voltage and a voltage level of the ground voltage.

11. The semiconductor apparatus of claim 10, wherein the negative voltage pumping unit further comprises:
a first switch configured to electrically couple and electrically decouple a second node to and from the ground terminal in response to a control signal; and
a second switch configured to electrically couple and electrically decouple the second node to and from an output node in response to an inverted control signal.

12. The semiconductor apparatus of claim 10, further comprising:

a negative voltage sensing unit configured to enable an oscillator enable signal when a negative voltage is increased.

13. The semiconductor apparatus of claim 10, further comprising:
a variable period oscillator configured to determine a frequency of the oscillator signal in response to an active signal.

14. The semiconductor apparatus of claim 11, wherein the capacitor, first switch, and second switch are configured to perform the pumping operation to generate a negative voltage.

15. The semiconductor apparatus of claim 14, wherein the first switch is turned to an on position to electrically couple the second node to the ground terminal, and the second switch is turned an off position to electrically decouple the second node from the output node.

16. The semiconductor apparatus of claim 14, wherein the first switch is turned to an off position and the second switch is turned to an on position to transfer a voltage level of the second node to the output node.

* * * * *